No. 818,431. PATENTED APR. 24, 1906.
C. H. GAMESON.
OIL SEPARATOR.
APPLICATION FILED NOV. 28, 1904.
4 SHEETS—SHEET 1.
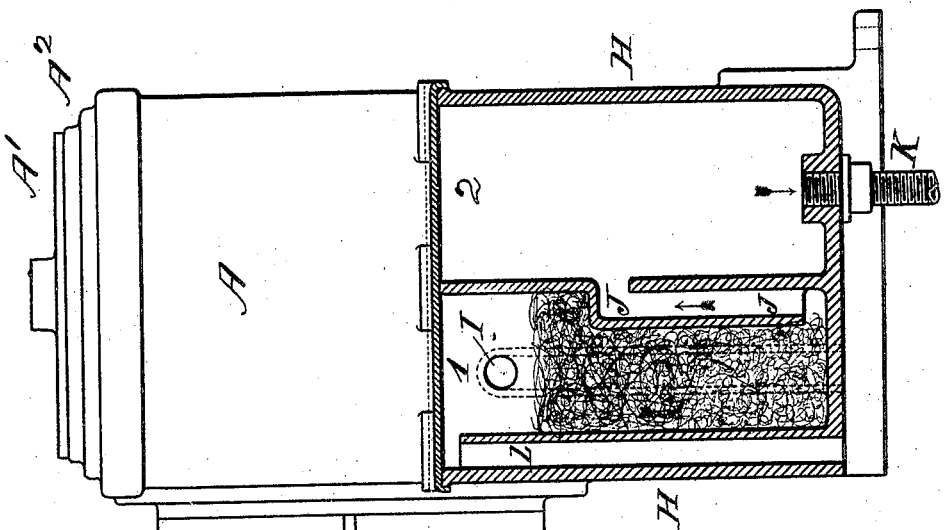
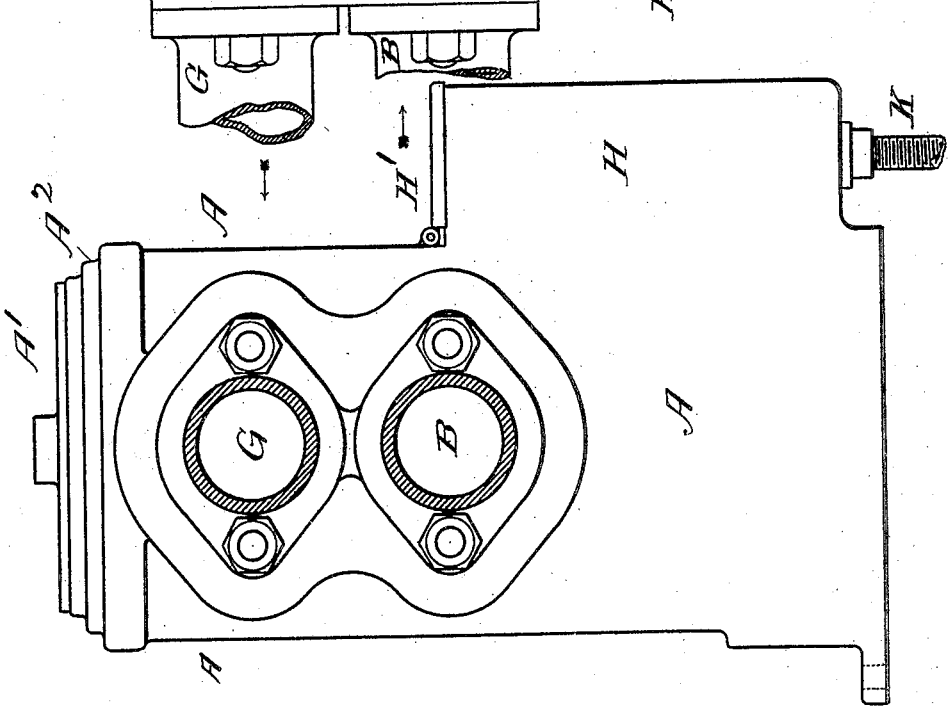
Witnesses
Inventor
Charles Henry Gameson
Attorneys

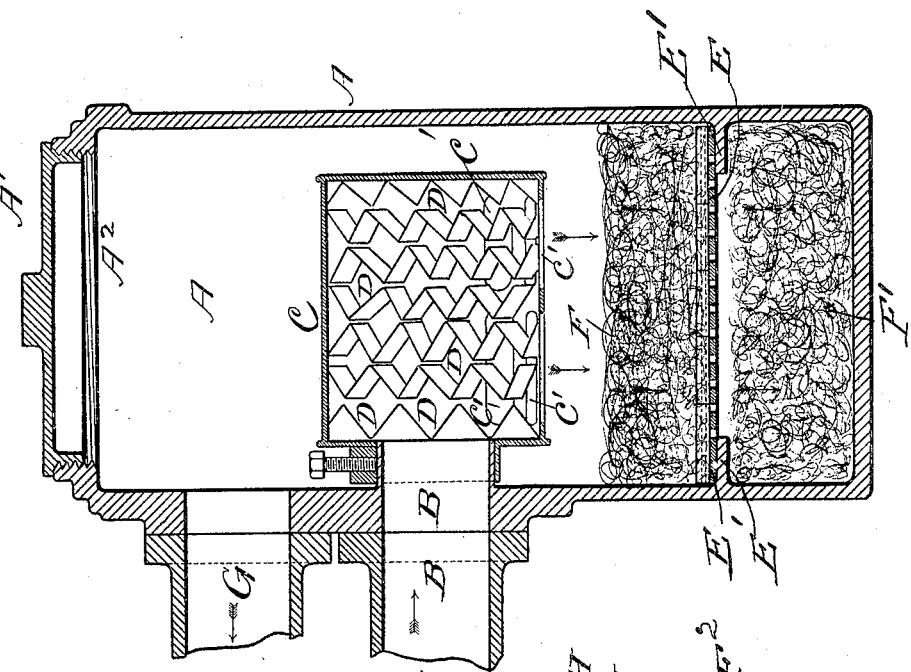
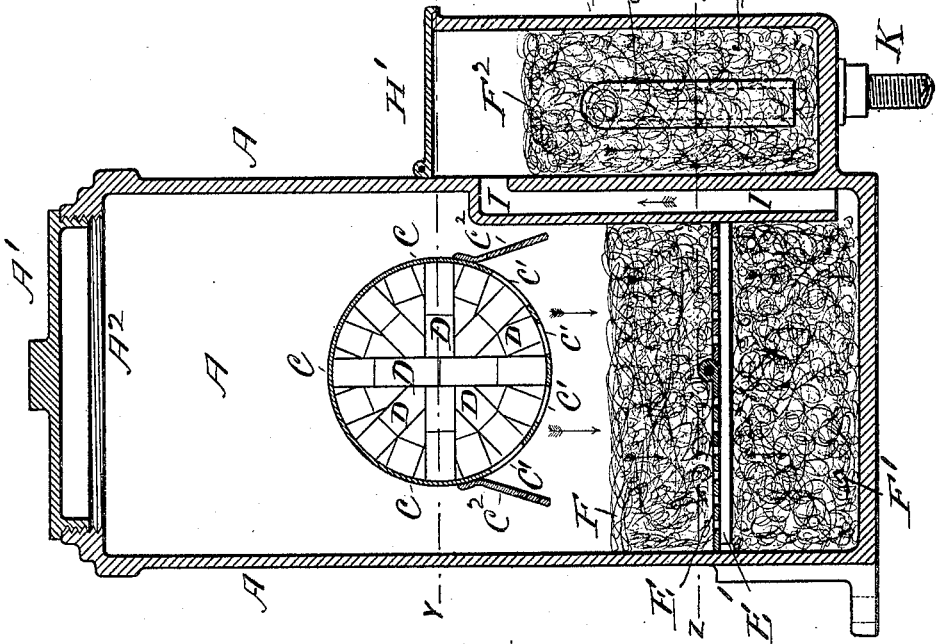

No. 818,431. PATENTED APR. 24, 1906.
C. H. GAMESON.
OIL SEPARATOR.
APPLICATION FILED NOV. 28, 1904.
4 SHEETS—SHEET 3.
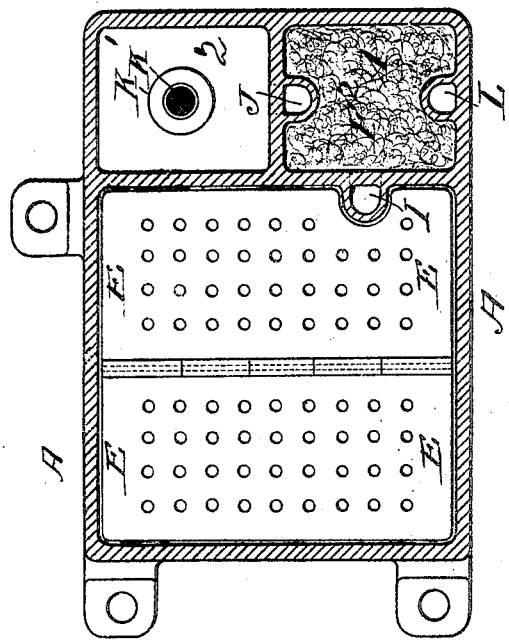
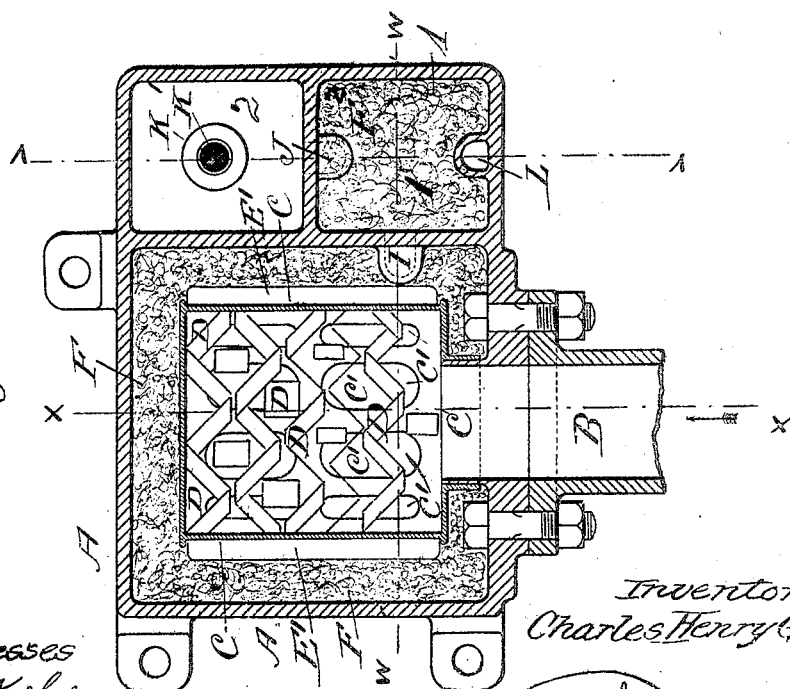

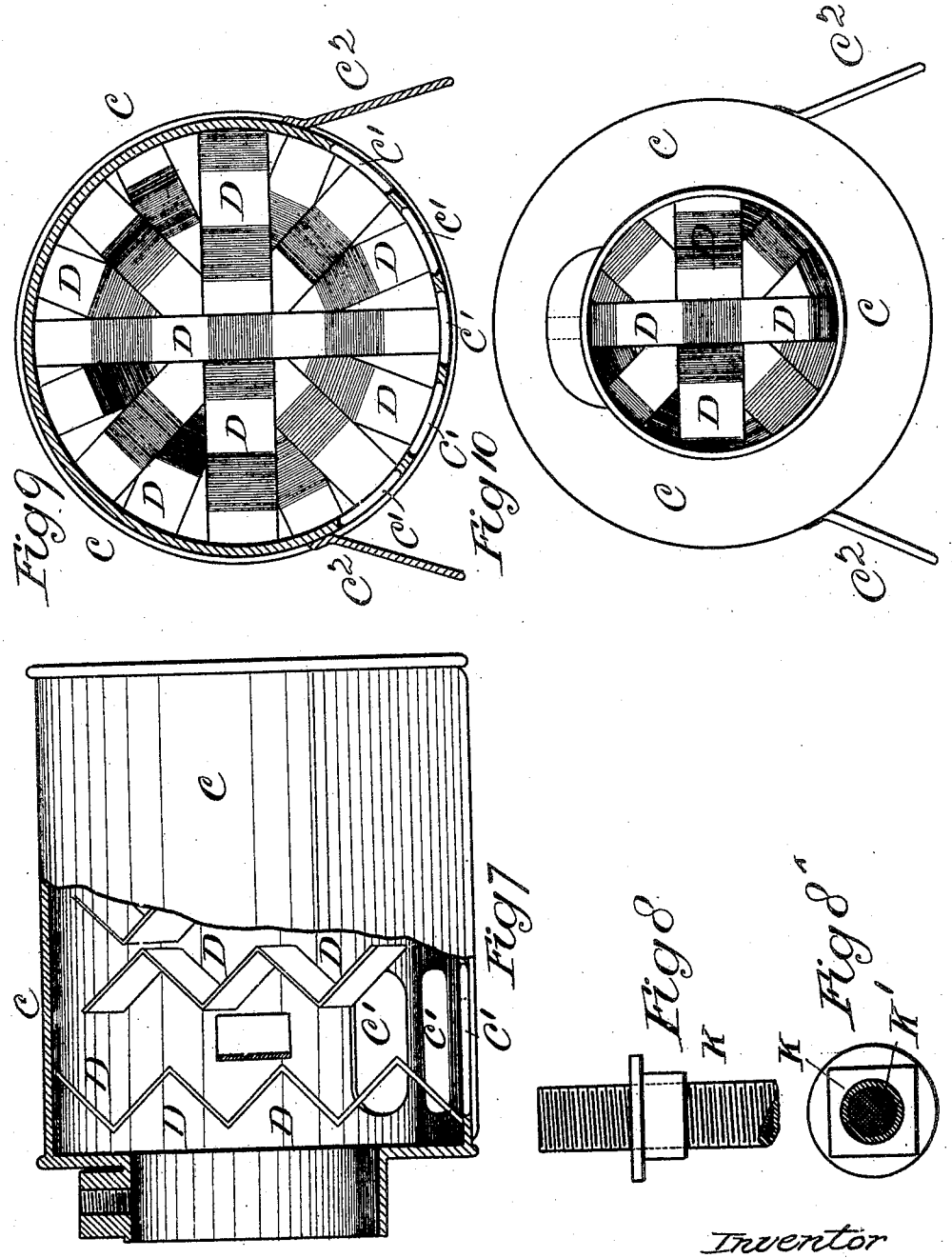

UNITED STATES PATENT OFFICE.

CHARLES HENRY GAMESON, OF COLDFIELD, NEAR BIRMINGHAM, ENGLAND.

OIL-SEPARATOR.

No. 818,431.      Specification of Letters Patent.      Patented April 24, 1906.

Application filed November 28, 1904. Serial No. 234,594.

*To all whom it may concern:*

Be it known that I, CHARLES HENRY GAMESON, a subject of the King of England, residing at Santa Monica, Blackroot Road, Sutton, Coldfield, near Birmingham, England, have invented new and useful Improvements in Oil Separators or Filters for Steam-Motor Cars and other Vehicles, Motor-Boats, Locomotive or other Engines, and the Like, of which the following is a specification.

My present invention relates to improvements in connection with oil separators or filters for steam-motor cars or other vehicles driven by steam and for motor-boats and locomotive and stationary engines or the like.

Hitherto considerable difficulty has been experienced in separating the oil or greasy substance used in lubricating the cylinders of steam-driven vehicles or engines, as the oil is apt to clog the condensing-pipes or condensers; and the object of my invention is to provide means whereby the oil or greasy substance is separated and retained within the separator, while the steam passes freely to the condensers and the water to the water-tank in a purified condition.

I desire to state that my invention does not apply to vacuum-condensers such as would be used in large stationary engines.

The object of the separator is for use where the supply of water is limited and for vehicles where this steam would not be allowed to blow off exhaust.

The invention is for the better condensation of steam and saving of water.

I proceed to describe my invention with reference to the several sheets of drawings, and which form a part of this specification.

Figure 1, Sheet 1, is a side elevation of the separator or filter. Fig. 2 is a sectional elevation on the line V V, Fig. 5. Fig. 3, Sheet 2, is a vertical section on line W W, Fig. 5. Fig. 4 is a vertical section on line X X, Fig. 5. Fig. 5, Sheet 3, is a sectional plan on line Y Y, Fig. 3. Fig. 6 is a sectional plan on line Z Z, Fig. 3. Fig. 7, Sheet 4, is a part-longitudinal sectional elevation of the separating-box. Fig. 8 is an elevation of the pipe leading to water-pump from water-container. Fig. 8$^A$ is a sectional plan of same. Fig. 9 is a sectional view through the separating-box. Fig. 10 is an end elevation of same.

For my purpose I provide a chamber A of any convenient shape and size. This is the steam chest or chamber and fitted with a screw steam-tight cap A', which seals an aperture A$^2$ on the top and which is large enough to admit the hand into the chamber A.

Approximately half-way of the depth of the steam-chamber A the exhasut-pipe B from the engine or engines enters.

I construct a separating-box C of copper or other suitable metal, preferably cylindrical, and of a size as much larger than the size of the exhaust-pipe B as may be conveniently passed through the aperture A$^2$ in the top of the steam-chamber. This separating-box C extends nearly across the steam-chamber A laterally and is fixed onto the exhaust-pipe B by a connection and forms a combination of same, but is detachable therefrom.

Inside the separating-box C, I fix a series of corrugated, plain, or zigzag strips of metal D, arranged crosswise—say about half an inch or an inch, more or less, apart and at various angles relative to the circumference of the separating-box C—so as to prevent back pressure to the engine or engines. The lower part of the separating-box C is perforated with holes C', round or oblong or of other shape, the total area of such holes being greater than the area of the exhaust-inlet pipe B—say about one-third of the circumference of the separating-box C, if cylindrical, and if square about one-fourth— through which holes C' the steam, &c., passes from the engine-exhaust pipe B. When a cylindrical or circular separating-box is employed, as described and shown, I preferably attach side wings C$^2$ immediately above the holes C' to prevent any rising or splashing of oil. I provide a perforated plate or plates E, and preferably hinged in the center to allow of it being passed into the steam-chamber A. This plate (or plates) E rests on ledges E' in the steam-chamber at a convenient distance below the exhaust-steam inlet B, and upon this perforated tray E, I place a suitable thickness of cotton-waste F or other material which will retain the oil or grease. Underneath this plate or tray E, I also fill in with cotton-waste F'.

The cotton-waste must be packed down sufficiently to overcome the pressure of steam to prevent an excess of steam passing through the outlet-pipe I in the water-chamber 1, hereinafter referred to, but sufficiently loose to allow the water to percolate.

The outlet-exhaust G from the steam-chamber I place above the level of the inlet-exhaust B, directly over said inlet by preference, though it may be in any other position which may be more convenient. Integral with or attached to the steam-chamber A is a side chamber or water-container H, with lid H' of suitable width and about one-half the height of the steam-chamber A, provided to take away the water filtered through the cotton-waste, for which purpose I employ a chamber divided into two compartments, preferably 1 2. Into the one compartment the outlet-pipe I from the steam-chamber A enters, which is carried up from, say, half an inch, more or less, from the bottom of the steam-chamber A to a convenient distance—say about three-fourths of the height of the water-chamber 1. At the bottom of this chamber I place cotton-waste $F^2$ to collect any oil or grease which may pass with the water.

In the chamber or compartment 1 a similar pipe J is provided about half the height of the water-chamber 1, which leads into the other compartment 2. At the bottom of the latter compartment a pipe K conveys the water to the pump or tank. The pipe K is provided with a gauze screen K' to prevent any foreign matter passing.

An overflow-pipe L is provided in the water-compartment 1, which prevents any oil or grease overflowing into the compartment 2.

Instead of dividing the water-container into two compartments I sometimes use one only, the arrangements will be practically the same; but by preference I employ two, as described and shown. The pipe that conveys the water from the steam-chamber to the water-container may be taken outside the steam-chamber, if preferred, and carried up into the water-container instead of inside, as shown. By my arrangement of apparatus the steam, water, and oil or greasy substance as they come from the engine or engines strike against the corrugated or zigzag strips of metal D in the separating-box C and the inside walls of the separating-box attached to the exhaust-inlet B, as shown, thereby splitting up the steam, water, and oil, the oil adhering to the strips D and inside walls of the separating-box C and dripping onto the cotton-waste F underneath, the water filtering through and passing into the water-compartments 1 2 by the waterways.

The steam has to pass out of the bottom of the separating-box C and rise to the top before passing out to the condensers, and thereby leaving the oil and grease and water behind. Upon opening the screw-cap A' of the aperture $A^2$ the oil will be found inside the separating-box C and collected in the cotton-waste, which has to be renewed, as required.

Having now described my invention, what I claim as new, and desire to secure by Letters Patent of the United States of America, is—

1. An oil separator or filter for steam-motor cars and other vehicles, motor-boats, locomotive or stationary engines or the like, consisting of a steam-chamber A with screw-cap A' and aperture $A^2$, exhaust-pipe B entering said chamber A, a separating-box C contained within the steam-chamber A and connected to exhaust-pipe B, strips of metal D arranged crosswise inside the separating-box C, holes C' in the lower part of the said separating-box, side wings $C^2$ above the holes C' substantially as described.

2. In an oil separator or filter for steam-motor cars and other vehicles, motor-boats or the like or for locomotive or other engines a steam-chamber A, exhaust-pipe B leading into same, a separating-box C containing strips of corrugated, plain or zigzag metal D a perforated plate or plates E arranged beneath said separating-box C, the cotton-waste F arranged between the separating-box and the perforated plate or tray and cotton-waste F' beneath the plate E all for the purpose substantially as described.

3. In an oil separator or filter for steam-motor cars, motor-launches or the like, or for locomotive or other engines the combination and arrangement of a steam-chamber A leading from compartment 1 and exhaust-pipe B, separating-box C, containing metal strips D perforated hinged plate or tray E cotton-waste F F', exhaust-outlet pipe G placed above the exhaust-inlet B—or elsewhere—a chamber or water-container H in connection with the steam-chamber A said water-container forming two compartments, 1, 2, the outlet-pipe I from steam-chamber A to compartment 1 cotton-waste $F^2$ the pipe J leading from compartment 1 and entering the water-compartment 2 the pipe K with gauze screen K' leading from compartment 2 to the pump or tank the overflow L in compartment 1 all operating in manner and for the purpose substantially as described and illustrated.

In testimony whereof I have signed my name to this specification in the presence of two subscribing witnesses.

CHARLES HENRY GAMESON.

Witnesses:
EDWD. BURTON PAYNE,
SAM WARD.